United States Patent
Bui et al.

(10) Patent No.: US 6,456,998 B1
(45) Date of Patent: Sep. 24, 2002

(54) EFFICIENT PROCESSING OF PARENT-CHILD RELATIONSHIPS IN A RELATIONAL DATABASE MANAGEMENT SYSTEM

(75) Inventors: Thuan Quang Bui, Fremont; Balakrishna Raghavendra Iyer, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,257

(22) Filed: Sep. 30, 1998

(51) Int. Cl.$^7$ ................................................ G06F 17/30
(52) U.S. Cl. .......................................... 707/2; 707/100
(58) Field of Search ................................ 707/1, 2, 200, 707/100, 101, 102, 103

(56) References Cited

U.S. PATENT DOCUMENTS

| | | | | |
|---|---|---|---|---|
| 5,303,367 A | * | 4/1994 | Leenstra, Sr. et al. | 707/102 |
| 5,355,317 A | * | 10/1994 | Talbott et al. | 364/468 |
| 5,359,523 A | * | 10/1994 | Talbott et al. | 364/468 |
| 5,787,439 A | * | 7/1998 | Taysom | 707/103 |
| 6,094,650 A | * | 7/2000 | Stoffel et al. | 707/3 |

OTHER PUBLICATIONS

OTMMATX.TXT –Matrix Transformation Tutorial (or if you prefer, a proven antidote for VLA 3d tutorials), Zach Mortensen, © 1995 found at www.aha.ru/–perrago/articles/matrix.txt on Sep. 30, 2000, 1995.*

"Representation of Tree Data Structures as Matrices Suitable for User Defined Traversing." IBM Technical Disclosure Bulletin, Apr. 1972, vol. 14, No. 11, pp. 3553–3554.*

"Representation of Tree Data Structures for Data Manipulation and Search Operations." IBM Technical Disclosure Bulletin, Apr. 1972, vol. 14, No. 11, pp. 3521–3522.*

Haderle, D.J. et al., Evaluation of Column Function on Grouped Data During Data Ordering, IBM Technical Bulletin No. 10B, vol. 32, Mar. 1990,. pp. 385–386.

Klug, A., "Access Path in the 'Abe' Statistical Query Facility", Proc. ACM SIGMOD, 1982, pp. 161–173.

* cited by examiner

*Primary Examiner*—Jack Choules
(74) *Attorney, Agent, or Firm*—Gates & Cooper LLP

(57) ABSTRACT

A method, apparatus, article of manufacture, and data structure for efficiently identifying parent-child relationships of a plurality of members. The parent-child relationships are encoded into a matrix, wherein a particular member is represented by a particular row and a particular column of the matrix. A value at an intersection of a specific one of the rows and a specific one of the columns indicates whether a parent-child relationship exists between the member represented by the row and the member represented by the column. Thereafter, matrix operations may be applied to the matrix.

44 Claims, 4 Drawing Sheets

| | A | B | C | D | E | F |
|---|---|---|---|---|---|---|
| A | 0 | 1 | 1 | 1 | 0 | 0 |
| B | 0 | 0 | 0 | 0 | 0 | 0 |
| C | 0 | 0 | 0 | 0 | 1 | 1 |
| D | 0 | 0 | 0 | 0 | 0 | 0 |
| E | 0 | 0 | 0 | 0 | 0 | 0 |
| F | 0 | 0 | 0 | 0 | 0 | 0 |

FIG. 3

|   | A | B | C | D | E | F |
|---|---|---|---|---|---|---|
| A | 0 | 1 | 1 | 1 | 0 | 0 |
| B | 0 | 0 | 0 | 0 | 0 | 0 |
| C | 0 | 0 | 0 | 0 | 1 | 1 |
| D | 0 | 0 | 0 | 0 | 0 | 0 |
| E | 0 | 0 | 0 | 0 | 0 | 0 |
| F | 0 | 0 | 0 | 0 | 0 | 0 |

EFFICIENT PROCESSING OF PARENT-CHILD RELATIONSHIPS IN A RELATIONAL DATABASE MANAGEMENT SYSTEM

BACKGROUND OF THE INVENTION

1. Field of the Invention

This invention relates in general to a computer-implemented relational database management system, and more particularly, to the efficient processing of parent-child relationships in a relational database management system.

2. Description of Related Art

Data in an Relational DataBase Management System (RDBMS) is organized into one or more tables that are comprised of rows and columns of data, wherein the rows are known as tuples and the columns are known as attributes. A database will typically have many tables and each table will typically have multiple tuples and multiple attributes. Users formulate relational operations on the tables, rows, and attributes, either interactively, in batch files, or embedded in host languages, such as C and COBOL.

It is common, in Internet "text mining" and "business intelligence" applications, for example, for tuples or attributes to be related to one another by one or more concepts or groups. For example, an Internet search engine works efficiently when a large collection of documents (e.g., web pages) are described and queried by a set of descriptive "concepts" (stemmed keywords after filtering stopwords and/or "characteristics" obtained by various means of parsing document content). Concept relationships are a natural way to provide meta-data. In particular, concept relationships often comprise parent-child relationships.

The Internet search engine may use tuples to represent documents and the attributes of those tuples may comprise pointers that define one or more concepts or groups among the documents. It may be necessary in such an application to access the tuples and then ascertain whether or not a tuple is or is not a descendant of another tuple in a particular group. One example is "document" ranking of documents or pages in an Internet "text mining" application by updating aggregate counts of various "concepts" derived from the text of a search query.

In such applications, the computation of aggregate functions for each individual concept or group is a basic, often repeated, operation. Often, an aggregate grouping function is used to rank one collection versus another. For example, an Internet search engine may use an aggregate grouping function to rank and/or organize documents or pages found by the Internet search engine.

A. Klug, *Access Path in the "Abe" Statistical Query Facility*, Proc. ACM SIGMOD, 1982, pp. 161–172, which is incorporated by reference herein, teaches that special treatment should be given to aggregation of groups. Efficiency for the aggregate grouping operator is addressed in D. J. Haderle, and E. J. Lynch, *Evaluation of Column Function on Grouped Data During Data Ordering*, IBM Technical Disclosure Bulletin, Mar. 10, 1990, pp. 385–386, which is incorporated by reference herein.

There remains, however, a need in the art for new techniques for representing such relationships and for processing queries relating to these relationships. The present invention provides these needed techniques.

SUMMARY OF THE INVENTION

To overcome the limitations in the prior art described above, and to overcome other limitations that will become apparent upon reading and understanding the present specification, the present invention discloses a method, apparatus, article of manufacture, and data structure for efficiently identifying parent-child relationships. The parent-child relationships are encoded into a matrix, wherein a particular member is represented by a particular row and a particular column of the matrix. A value at an intersection of a specific one of the rows and a specific one of the columns indicates whether a parent-child relationship exists between the member represented by the row and the member represented by the column. Thereafter, matrix operations may be applied to the matrix.

An object of the invention is to provide an improved system for encoding parent-child relationships. Another object of the present invention is to encode such relationships in a manner that allows various operations to be performed on the encoding. Yet another object of the present invention is to identify multiple levels of ancestors/descendants of a member based on the encoding.

BRIEF DESCRIPTION OF THE DRAWINGS

Referring now to the drawings in which like reference numbers represent corresponding parts throughout:

FIG. 3 illustrates a matrix structure that represents the parent-child relationships in the hierarchy of FIG. 2.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The present invention describes a method that efficiently identifies descendents/ancestors of any member involved in a parent-child relationship. The relationship can be arbitrary as long as cyclic relationships are not generated.

The parent-child relationships are first encoded into a matrix. Each row and each column represents a member. A value in a particular cell or intersection of the rows and columns indicates whether the row member is a parent to the column member. Changes in parent-child relationships may be effected by changing the values stored at various locations in the matrix.

Thereafter, matrix operations can be applied to the matrix as desired. For example, matrix multiplication can be applied to the matrix to determine parent-to-child relationships, grandparent-to-grandchild relationships, great-grand parent relationships, and so on, as further iteration establishes further ancestry. When an iterative matrix multiplication provides a completely null matrix, all ancestor relationships have been enunciated.

Hardware Environment

Figure 1:
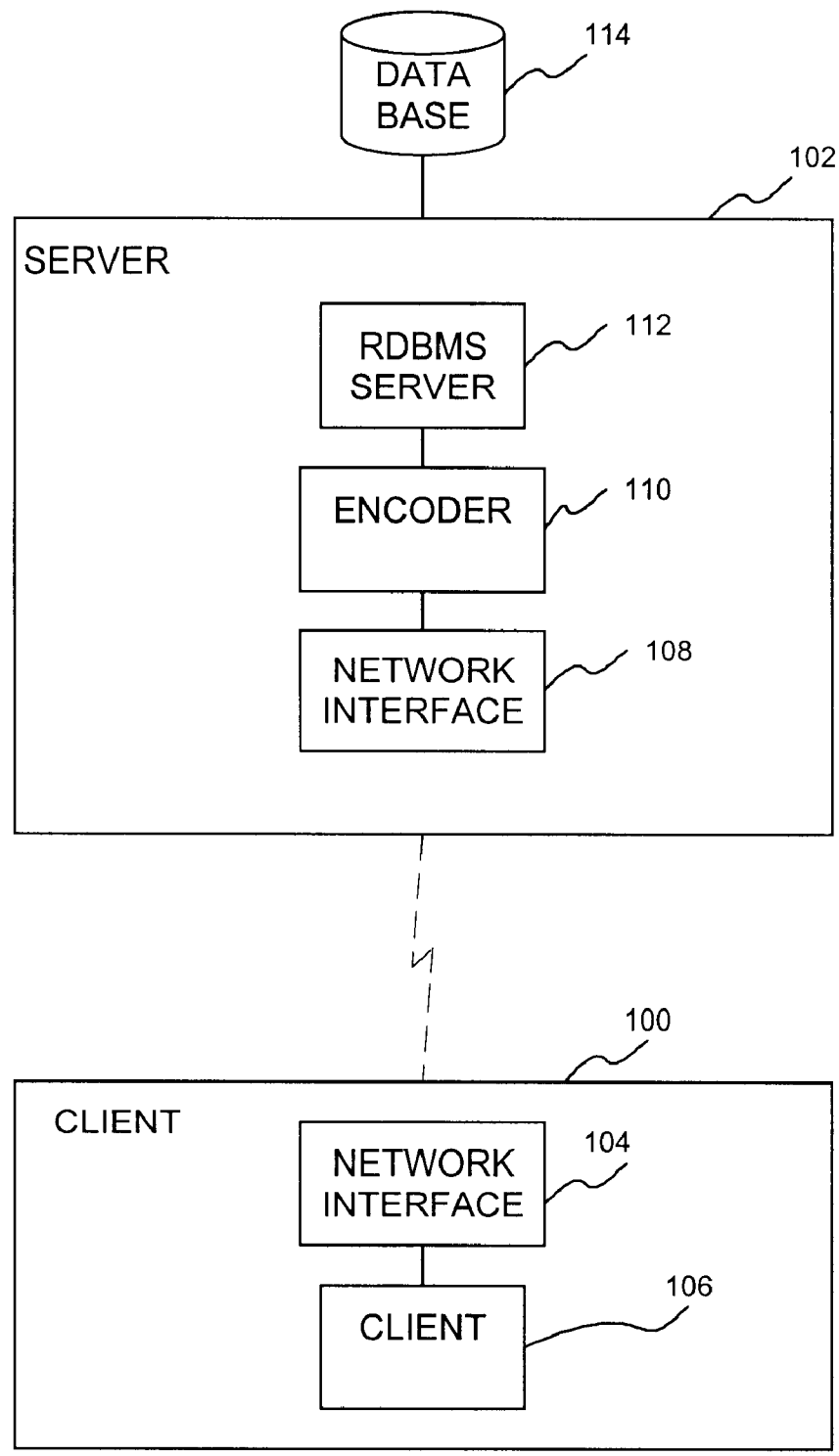
FIG. 1 is an exemplary hardware environment used to implement the preferred embodiment of the invention.

FIG. 1 is a block diagram illustrating an exemplary hardware environment used to implement the preferred embodiment of the present invention. In the exemplary hardware environment, a client/server architecture is illustrated comprising a client computer 100 coupled to a server computer 102. In the exemplary hardware environment, the client 100 and server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

In the example illustrated in FIG. 1, the present invention includes a network interface program 104 and a client program 106 executed by the client 100, and a network interface program 108, an encoder program 110, and an RDBMS server program 112 executed by the server 102. These various components are used to perform various operations, including search and retrieval operations, insert operations, update operations, and delete operations, against one or more relational databases 114 stored on a remote or local data storage device.

The network interface program 104, client program 106, network interface program 108, encoder program 110, RDBMS server program 112 and databases 114 are comprised of logic, instructions, data structures, and/or data which, when read, interpreted and/or executed by the client 100 and/or server 102, causes the client 100 and/or server 102 to perform the steps necessary to implement and/or use the present invention. Generally, the logic, instructions, data structures, and/or data are tangibly embodied in and/or readable from a device, carrier, or media, such as a memory, data storage device, and/or remote devices connected to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "carrier or product") as used herein is intended to encompass one or more computer programs accessible from any device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Example Relationships: A Hierarchy Structure

Figure 2:
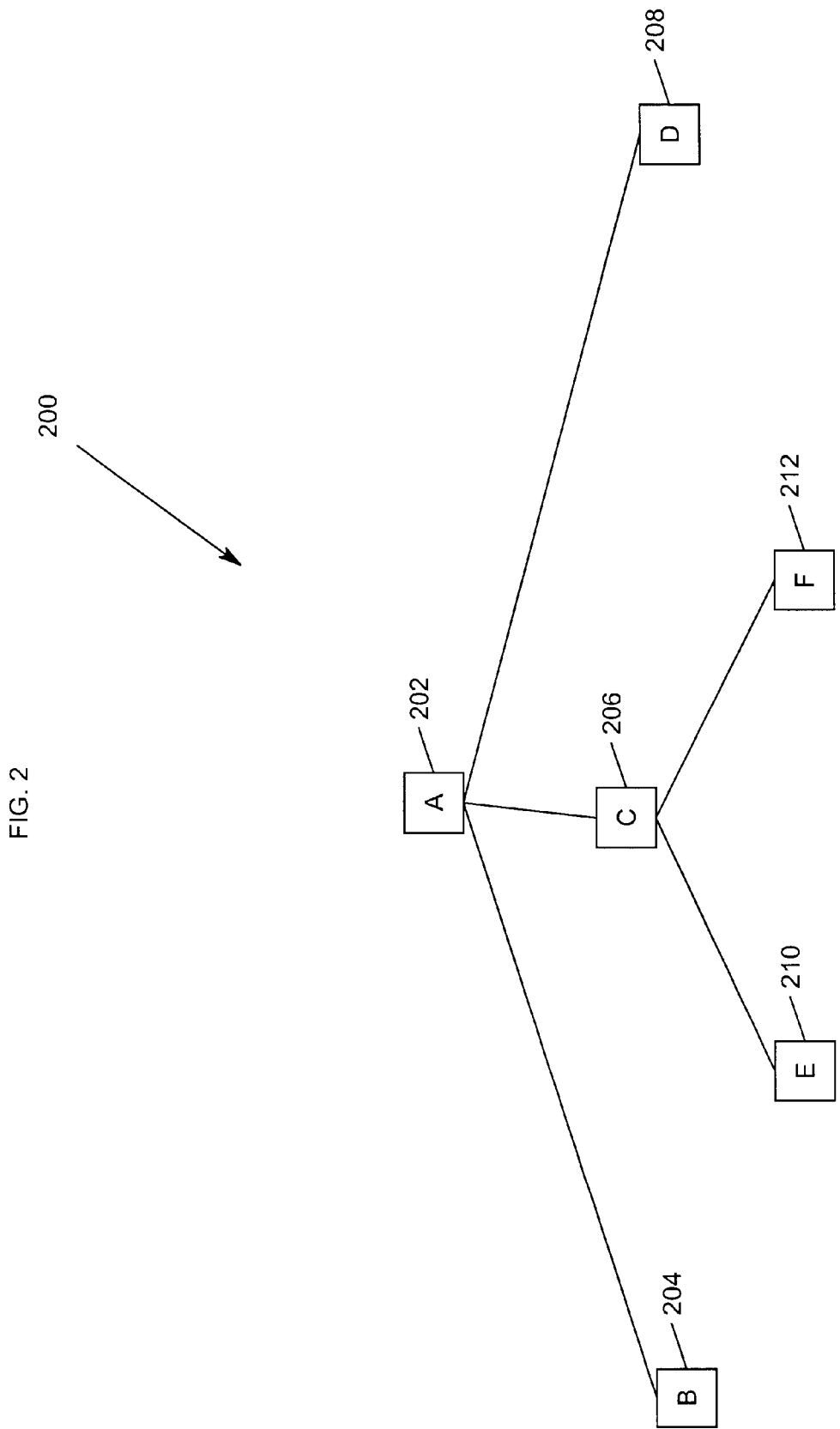
FIG. 2 illustrates a tree structure that represents a hierarchy of objects.

FIG. 2 illustrates a tree structure 200 that represents a hierarchy of objects. A tree structure 200 has a root node 202 from which all other nodes 204–212 in the tree 200 depend. A node 202 or 206 from which other nodes 204–212 or 210–212, respectively, depend is called a parent node. Nodes 204–212 or 210–212 that depend from another node 202 or 206, respectively, are called child nodes. A child node is said to be a descendent of a parent node, and a parent node is said to be an ancestor of a child node. For example, the root node "1" (202) is an ancestor node of each other node 204–212 in the tree 200, but it does not have an ancestor itself. The node "3" (206) has an ancestor node "1" (202) and child nodes "5" (210) and "6" (212). Nodes 204, 208, 210, and 212 that have ancestor nodes and no child nodes are termed leaf nodes. For example, node "1" (204) is a leaf node that has an ancestor node "1" (202) and no child nodes.

The nodes in FIG. 2 represent members of a domain. Each of the members has an associated label (e.g., number) for identifying the node in the tree.

One skilled in the art would recognize that the illustration provided in FIG. 2 is an example only and that other parent-child relationships and other structures could be used with the present invention.

Example Matrix Structure

FIG. 3 illustrates a matrix structure that represents the parent-child relationships in the hierarchy 200 of FIG. 2. Notice that the objects in the hierarchy 200 comprise both rows and columns of the matrix. Notice also that the matrix, or various iterations thereof, may be stored as a table in the database 114 of the RDBMS 112.

Each cell in position (x,y) of the matrix is set to 1 to indicate that the object that is a label for column x is a child of the object that is the label for row y; otherwise, the cell is set to 0. Thus, objects labeling rows can be parents of objects labeling columns.

Of course, in alternative embodiments, objects labeling columns can be parents of objects labeling rows. Moreover, values or indicators other than 0/1 may be used within the matrix.

The matrix is especially useful when the objects represent tuples or attributes stored in the database 114 by the RDBMS server 112. For example, on accessing a tuple B, it may be necessary to ascertain whether or not the tuple B is or is not a descendant of a tuple A, and then update the appropriate aggregates. Such an example may arise on the Internet as when performing a "document" ranking of Web pages by updating aggregate counts of various "concepts" derived from the text of a search query. Thus, if the cell at row B, column A of the matrix is 1, then B is a child of A.

To determine further ancestry, namely grandparent-to-grandchild relationships, the matrix product can be simply computed as M*M, wherein M represents the matrix. If the value of the cell at row B, column A is 1 for M*M, then B is a grandchild of A.

Iteratively, M*M*M establishes great-grand parent relationships. Further iteration establishes further ancestry. When the iterative matrix multiplication of M gives a null matrix (i.e., all cells are 0 when 0 indicates an absence of a relationship), all ancestor relationships have been enunciated.

Changes in parent-child relationships may be effected by changing the matrix M. When M is sparse, there are many techniques known in the art that can compress the sparse matrix M, and perform matrix multiplication. This is an orthogonal issue to the present invention.

One skilled in the art would recognize that the illustration provided in FIG. 3 is an example only and that other parent-child relationships and other structures could be used with the present invention.

Matrix Logic

Figure 4:
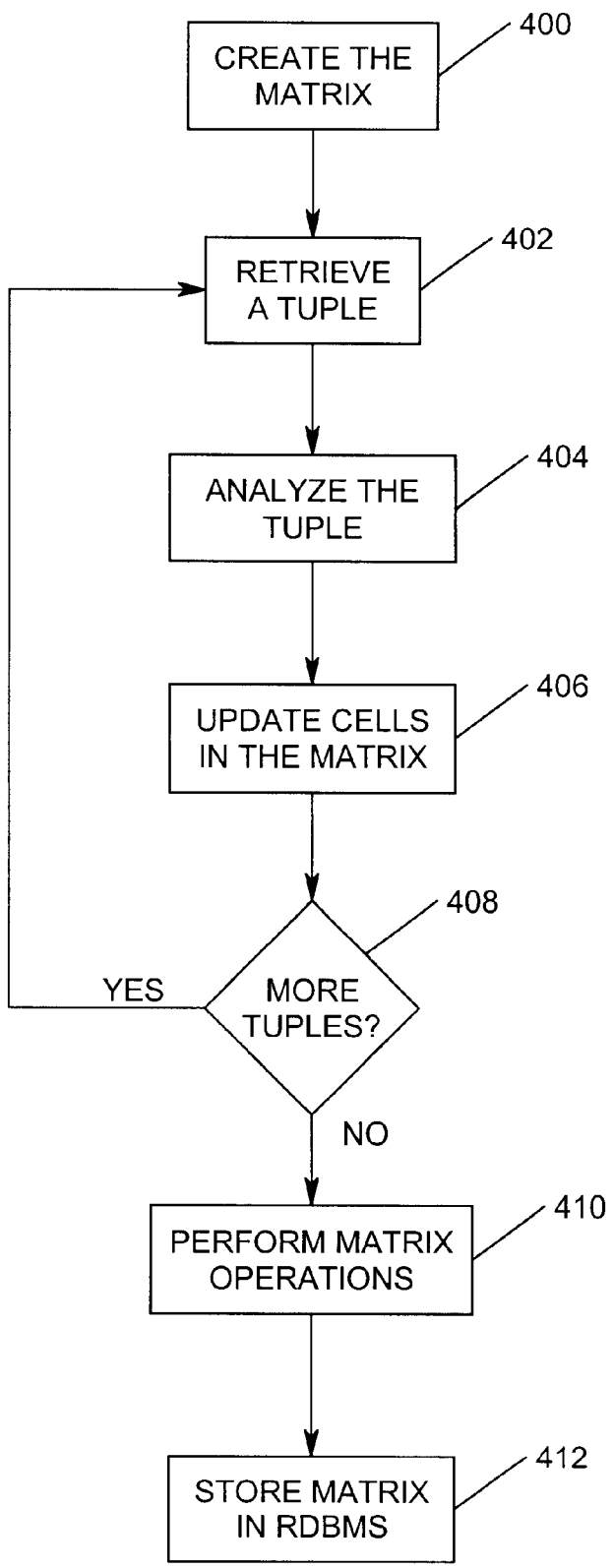
FIG. 4 is a flow diagram illustrating the logic performed according to the present invention.

FIG. 4 is a flow diagram illustrating the logic performed in accordance with the present invention. In the preferred embodiment, this logic is performed by the encoder 110. Of course, in other embodiments, this logic could be performed by the client program 106, RDBMS server 112, or some other entity.

Block 400 represents the encoder 110 creating a matrix in the memory of the server computer 102.

Blocks 402–406 together are a loop that represents the encoder 110 retrieving desired tuples from the RDBMS server 112 (402), analyzing the retrieved tuples to determine the structure represented by the tuples (404), and then updating the cells in the matrix according to the structure represented by the tuples (406).

Block 408 is a decision block that represents the encoder 110 determining whether additional tuples need to be retrieved from the RDBMS server 112. If not, control transfers to Block 410; otherwise, control transfers to Block 402.

After the matrix has been created, Block 410 represents the encoder 110 performing matrix operations thereon.

Finally, Block 412 represents the encoder 110 storing the matrix, either as created or after the matrix operations have been performed thereon, as a table in the RDBMS server 112. This step allows the encoder 110 to later retrieve the matrix rather than recreating it on demand.

Conclusion

This concludes the description of the preferred embodiment of the invention. The following describes some alternative embodiments for accomplishing the present invention. For example, any type of configuration, including standalone computers or computer networks, could be used to implement the present invention. Moreover, any type of computer, such as a mainframe, minicomputer, workstation, or personal computer, could be used with the present invention. Finally, any type of RDBMS could benefit from the present invention.

In summary, the present invention discloses a method, apparatus, article of manufacture, and data structure for efficiently identifying parent-child relationships. The parent-child relationships are encoded into a matrix, wherein a particular member is represented by a particular row and a particular column of the matrix. A value at an intersection of a specific one of the rows and a specific one of the columns indicates whether a parent-child relationship exists between the member represented by the row and the member represented by the column. Thereafter, matrix operations may be applied to the matrix.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of efficiently identifying parent-child relationships of a plurality of members, comprising:

(a) encoding the parent-child relationship into a matrix, wherein each of the members is represented by a row or column of the matrix and a value at an intersection of one of the rows and one of the column indicates whether a parent-child relationship exists between the member represented by the row and the member represented by the column; and (b) applying a matrix multiplication operation to the matrix to determine ancesory relationships of the members.

2. The method of claim 1 above, wherein the matrix multiplication operation meltiples the matrix by itself.

3. The method of claim 1 above, wherein the matrix multiplication operation comprises an iterative matrix multiplication operation that is applied to the matrix to determine the ancestry relationships.

4. The method of claim 3 above, wherein the iterative matrix multiplication operation has enunciated all of the ancestor relationships when it results in a completely null matrix.

5. The method of claim 1 above, wherein the parent-child relationships are arbitrary.

6. The method of claim 1 above, wherein the parent-child relationships are not cyclic.

7. The method of claim 1 above, further comprising effecting changes in the parent-child relationships by changing the values stored at one or more intersections of rows and columns in the matrix.

8. The method of claim 1 above, wherein the members are selected from a group comprising tuples and attributes.

9. The method of claim 1 above, wherein the members represent a domain.

10. The method of claim 1 above, wherein a value at the intersection of the row and the column indicates whether the member represented by the tow is the parent of the member represented by the column.

11. The method of claim 1 above, wherein a value at the intersection of the row and the column indicates whether the member represented by the column is the patent of the member represented by the row.

12. A processor-implemented system for efficiently identifying parent-child relationships of a plurality of members, comprising:

(a) a processor; and (b) logic, performed by the processor, for encoding the parent-child relationships into a matrix, wherein each of the members is represented by a row or column of the matrix and a value at an intersection of one of the rows and one of the columns indicates whether a parent-child relationship exists between the member represented by the row and the member represented by the column, and for applying a matrix multiplication operation to the matrix to determine ancestry relationships of the members.

13. The system of claim 12 above, wherein the matrix multiplication operation multiples the matrix by itself.

14. The system of claim 12 above, wherein the matrix mulitplication operation comprises an iterative matrix multiplication operation that is applied to the matrix to determine the ancestry relationships.

15. The system of claim 14 above, wherein the iterative matrix multiplication operation has enunciated all of the ancestor relationships when it results in a completely null matrix.

16. The system of claim 12 above, wherein the parent-child relationships are arbitrary.

17. The system of claim above, wherein the parent-child relationships are not cyclic.

18. The system of claim 12 above, further comprising logic, performed by the processor, for effecting changes in the parent-child relationships by changing the values stored at one or more intersections of rows and columns in the matrix.

19. The system of claim 12 above, wherein the members are selected from a group comprising tuples and attributes.

20. The system of claim 12 above, wherein the members represent a domain.

21. The system of claim 12 above, wherein a value at the intersection of the row and the column indicates whether the member represented by the row is the parent of the member represented by the column.

22. The system of claim 12 above, wherein a value at the intersection of the row and the column indicates whether the member represented by the column is the parent of the member represented by the row.

23. An article of manufacture comprising a carrier embodying logic for a method of efficiently identifying parent-child relationships of a plurality of members, comprising:

(a) encoding the parent-child relationships into a matrix, wherein each of the members is represented by a resow or column of the matrix and a value at an intersection of a row and a column indicates whether a parent-child relationship exists between the member represented by the row and the member represented by the column; and (b) applying a matrix multiplication operation to the matrix to determine ancestry relationships of the members.

24. The method of claim 23 above, wherein the matrix multiplication operation multiplies the matrix by itself.

25. The method of claim 23 above, wherein the matrix multiplication operation comprises an iterative matrix multiplication operation that is applied to the matrix to determine the ancestry relationships.

26. The method of claim 25 above, wherein the iterative matrix multiplication operation has enunciated all of the ancestor relationships when it results in a completely null matrix.

27. The method of claim 23 above, wherein the parent-child relationships are arbitrary.

28. The method of claim 23 above, wherein the parent-child relationships are not cyclic.

29. The method of claim 23 above, further comprising the step of effecting changes in the parent-child relationships by changing the values stored at one or more intersections of rows and columns in the matrix.

30. The method of claim 23 above, wherein the members are selected from a group comprising tuples and attributes.

31. The method of claim 23 above, wherein the members represent a domain.

32. The method of claim 25 above, wherein a value at the intersection of the tow and the column indicates whether the member represented by the tow is the parent of the member represented by the column.

33. The method of claim 23 above, wherein a value at the intersection of the tow and the column indicates whether the member represented by the column is the parent of the member represented by the row.

34. A data structure for efficiently identifying parent-child relationships of a plurality of members, the data structure being stored in a data storage device for use by a processor, the data structure comprising a matrix encoding the parent-child relationships, wherein each of the members is represented by a row or column of the matrix, a value at an intersection of a row and a column indicates whether a parent-child relationship exists between the member represented by the row and the member represented by the column, and a matrix multiplication operation applied to the matrix determines ancestry relationships of the members.

35. The data structure of claim 34 above, wherein the matrix multiplication operation multiples the matrix by itself.

36. The data structure of claim 34 above, wherein the matrix multiplication operation comprises an iterative matrix multiplication operation that is applied to the matrix to determine the ancestry relationships.

37. The data structure of claim 36 above, wherein the iterative matrix multiplication operation has enunciated all of the ancestor relationships when it results in a completely null matrix.

38. The data structure of claim 34 above, wherein the parent-child relationships are arbitrary.

39. The data structure of claim 34 above, wherein the parent-child relationships are not cyclic.

40. The data structure of claim 34 above, further comprising effecting changes in the parent-child relationships by changing the values stored at one or more intersections of rows and columns in the matrix.

41. The data structure of claim 34 above, wherein the members are selected from a group comprising tuples and attributes.

42. The data structure of claim 34 above, wherein the members represent a domain.

43. The data structure of claim 34 above, wherein a value at the intersection of the row and the column indicates whether the member represented by the row is the parent of the member represented by the column.

44. The data structure of claim 34 above, wherein a value at the intersection of the row and the column indicates whether the member represented by the column is the parent of the member represented by the row.

\* \* \* \* \*

UNITED STATES PATENT AND TRADEMARK OFFICE
CERTIFICATE OF CORRECTION

PATENT NO. : 6,456,998 B1  
DATED : September 24, 2002  
INVENTOR(S) : Thuan Quang Bui and Balakrishna Raghavendra Iyer It is certified that error appears in the above-identified patent and that said Letters Patent is hereby corrected as shown below:

<u>Title page,</u>  
Item [56], References Cited, OTHER PUBLICATIONS, reference "OTMMATX.TXT", www.aha.ru/-perrago" should read -- www.aharu/~pervago --

<u>Column 5,</u>  
Line 64, "column" should read -- columns --

<u>Column 6,</u>  
Line 2, "ancesory" should read -- ancestry --  
Line 5, "meltiples" should read -- multiplies --  
Line 27, "tow" should read -- row --  
Line 32, "patent" should read -- parent --  
Line 48, "multiples" should read -- multiplies --  
Line 50, "mulitplication" should read -- multiplication --

<u>Column 7,</u>  
Line 16, "resow" should read -- row --  
Lines 49 and 50, "tow" should read -- row --

<u>Column 8,</u>  
Line 2, "tow" should read -- row --  
Line 18, "multiples" should read -- multiplies --

Signed and Sealed this

Second Day of September, 2003

JAMES E. ROGAN  
*Director of the United States Patent and Trademark Office*